United States Patent
Tanaka et al.

(10) Patent No.: US 7,061,355 B2
(45) Date of Patent: Jun. 13, 2006

(54) FERRITE CORE, CATV EQUIPMENT AND BI-DIRECTIONAL CATV SYSTEM

(75) Inventors: Satoru Tanaka, Tottori-Ken (JP); Norikazu Koyuhara, Tottori-ken (JP); Makoto Kadowaki, Tottori-ken (JP); Yoshihito Yoshikawa, Saitama-ken (JP); Shiro Murakami, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/649,777

(22) Filed: Aug. 28, 2003

(65) Prior Publication Data

US 2004/0113742 A1 Jun. 17, 2004

(30) Foreign Application Priority Data

Aug. 30, 2002 (JP) .............................. 2002-253414
Oct. 11, 2002 (JP) .............................. 2002-298614

(51) Int. Cl.
*H01F 17/06* (2006.01)

(52) U.S. Cl. ...................................... 336/175; 336/221

(58) Field of Classification Search ........ 336/174–175, 336/221, 223, 229, 200; 252/62.6; 428/692; 333/162, 181–185
See application file for complete search history.

(56) References Cited

U.S. PATENT DOCUMENTS

| 5,153,539 | A  | * | 10/1992 | Hara et al. ................... 333/182 |
| 6,071,430 | A  | * | 6/2000  | Lebourgeois et al. ...... 252/62.6 |
| 6,346,337 | B1 | * | 2/2002  | DeCristofaro et al. ...... 428/692 |
| 2002/0080001 | A1 | * | 6/2002 | Kobayashi et al. ......... 336/229 |

FOREIGN PATENT DOCUMENTS

| JP | 2001-285819 | 10/2001 |
| JP | 2002-204439 | 7/2002  |

* cited by examiner

*Primary Examiner*—Lincoln Donovan
(74) *Attorney, Agent, or Firm*—Sughrue Mion, PLLC

(57) ABSTRACT

A ferrite core for use in coupling transformers and distributing transformers in CATV equipments such as couplers, distributors and amplifiers, the ferrite core being made of a ferrite having a saturation magnetostriction $|\lambda_S|$ of $8 \times 10^{-6}$ or less in an absolute value and an initial permeability $\mu_i$ of 300 or more.

5 Claims, 8 Drawing Sheets

FERRITE CORE, CATV EQUIPMENT AND BI-DIRECTIONAL CATV SYSTEM

FIELD OF THE INVENTION

The present invention relates to a bi-directional CATV (Community Antenna Television or Cable Television) system, particularly to a bi-directional CATV system effective in decrease of ingress noise, CATV equipments for such a bi-directional CATV system, coupling transformers and distributing transformers used in such CATV equipments and a ferrite core used in such transformers.

BACKGROUND OF THE INVENTION

Well known as CATV systems provide multi-channel television broadcasting utilizing a tree-type distribution network, for instance, shown in FIG. 1 or a star-type distribution network. Recently, these CATV systems are utilized for services transmitting information with high speed and capacity such as the Internet, etc., and data communication in digital broadcasting from terminals of digital broadcasting subscribers to the center station.

In such CATV systems, transmission lines such as coaxial mainlines, optical fiber cables, etc. are laid between the center station and terminals of the CATV system subscribers. Disposed in the transmission lines are CATV equipments such as bi-directional amplifiers for bi-directional CATV signals, and devices such as distributors, couplers, etc. for dividing CATV signals.

FIG. 2 is a block diagram showing one example of the use of CATV equipments in a CATV system.

In FIG. 2, bi-directional amplifiers 15a to 15c out of bi-directional amplifiers 15a to 15d are disposed in the mainline.

A branch cable downstream side of a protector 18 is led into a subscriber residence and connected to a computer 16, a television receiver 14, etc., via a bi-directional amplifier 15d, a noise filter 19 such as choke coils, etc. and a splitter 20. On the other hand, the line upstream side of the protector 18 is connected to the headend 10 via a distributor 13, a coupler 12 and the bi-directional amplifiers 15a to 15c. An RF modem connected to the computer 16 and a home terminal connected to the television receiver 14 are not shown in FIG. 2.

FIG. 3 is a block diagram showing one example of the bi-directional amplifier used in a CATV system. The bi-directional amplifier 150 comprises a forward amplifier, a return amplifier, a filter, and a coupler and/or a distributor. In FIG. 3, CATV signals input to an input terminal 160a enter a forward amplifier 180a, which amplifies the signals to the predetermined level, via a high-pass filter 170a and an attenuator 185a, and then the amplified signals are output to the output terminal 160b via a high-pass filter 170b and a coupler 190. Return signals traveling from a terminal of the CATV system subscriber input to a coupling terminal 160c, enter a return amplifier 180b, which amplifies the return signals to the predetermined level, via a coupler 190, a low-pass filter 175b and an attenuator 185b, and then the amplified signals are output to the input terminal 160a via a low-pass filter 175a. The coupling terminal 160c may be used as a monitor terminal to measure the output level. A distributor may be used instead of the coupler in the bi-directional amplifier.

FIG. 4 is a block diagram showing one example of a coupler 100 used in a CATV system. Forward or downstream signals are input to an input terminal 120a and output to an output terminal 120b and a coupling terminal 120c via a coupling transformer 110. Return signals input to the output terminal 120b are output to the input terminal 120a, not to the coupling terminal 120c. Return or upstream signals input to the coupling terminal 120c are output to the input terminal 120a, not to the output terminal 120b.

The coupling transformer 110 comprises a first transformer 110a and a second transformer 110b. One example of the coupling transformer 110 is constituted by a multi-hole ferrite core with windings as shown in FIG. 6. The ferrite core shown in FIG. 6 comprises two through-holes, called "spectacle core." A winding L1 of the first transformer 110a passing through one through-hole 55a is connected to the input terminal 120a at one end and to the output terminal 120b at the other end. A winding L4 of the second transformer 110b passing through the other through-hole 55b is connected to the terminal 120c at one end and to the resistor 105 at the other end. The winding L2 is wound around the through-hole 55a, while the winding L3 is wound around the through-hole 55b. One end of the winding L2 and one end of the winding L3 are connected to each other as a center tap and grounded. The other end of the winding L2 is connected between a winding L4 and a resistor 105 and grounded via the resistor 105. The other end of the winding L3 is connected to the output terminal 120b of the winding L1.

FIG. 5 is a block diagram showing one example of a distributor 200 used in a CATV system. This distributor 200 comprises an input terminal 220a connected to the headend side and output terminals 220b, 220c connected to the terminal side to bisect signals by a distributing transformer 210.

One example of the distributing transformer 210 is constituted by a toroidal core shown in FIG. 7 and windings L1, L2 wound around the toroidal core. The winding L1 has one end connected to the input terminal 220a and the other end connected to a ground. Both ends of the winding L2 are connected to output terminals 220b, 220c, with a resistor 205 connected in parallel with the winding L2. The middle points of the windings L1, L2 are connected to each other. With respect to the return signals, the input terminal 220a functions as an output terminal, while the output terminals 220b, 220c function as input terminals.

The turn ratios of the windings in the coupling transformer and the distributing transformer may be properly determined in accordance with coupling required for each transformer.

When the coupling transformer and/or the distributing transformer are used in the bi-directional amplifier, each terminal may properly be provided with a DC-blocking capacitor so that the electric power of the power supply overlapped to high frequency signals to supply electric power to the amplifiers is not applied to the above transformers.

In such a CATV network, data communications such as the Internet use a frequency bandwidth which television broadcasting does not use. In Japan, forward signals such as TV signals of VHS, UHF, BX, CS, etc. from a center station use a transmission bandwidth of 70 MHz to 1.3 GHz. The current CS digital broadcasting uses a frequency bandwidth up to 2.61 GHz. In bi-directional CATV networks, return signals such as data signals in the Internet, etc. from subscriber terminals to a center station use a transmission bandwidth of 10 MHz to 55 MHz. The U.S. and Europe use a frequency bandwidth of 5 MHz to 70 MHz for return signals (data signals), though there is slight difference in the frequency bandwidth, which television broadcasting does not use, from Japan.

The return signals received by the center station (head-end) contain large noise components entering from subscribers, mainlines and transmission equipments of branch lines. Such noise called "ingress noise" deteriorates the quality of such as a C/N ratio, etc. of return signals and destabilizes the Internet connection. When large-volume files and video data, etc. are transmitted, the ingress noise causes serious problems, requiring proper measures.

It has conventionally been considered that the ingress noise is mainly caused by thermal noise generated in terminal equipments such as computers, bi-directional amplifiers, etc., the noises of domestic electric appliances (for instance, the ignition noise of hairdryers and fluorescent lamps, pulse noise generated at the time of switching microwave ovens, the compressors of inverter air conditioners and refrigerators, etc.), citizens' radio communications, short-wave broadcasting, etc. The measures for such ingress noise have conventionally been as follows:

(a) Increasing the shielding of CATV circuits and equipments.
(b) Cutting off signals in a return bandwidth in the terminals using no return signals.
(c) Cutting off branching circuits generating large ingress noise.
(d) Using an HFC (hybrid fiber and coaxial) system comprising optical fibers in mainlines and photoelectric converters disposed at the ends of mainlines for connecting branch lines constituted by coaxial cables to subscribers, to decrease the number of terminals connected to one tree-type transmission system to reduce noise to some extent.

There are also the following measures investigated by various companies, though some measures fail to utilize the existing infrastructure. Accordingly, they are not put in practical use.

(e) Changing the frequency bandwidth of return signals to that causing little noise.
(f) Using a modulation system highly resistant to noise.
(g) Using only one terminal in a return path, from which LAN is constituted by using LAN cables, telephone lines, etc.

Though the above measures provide some effects, it has been found that return signals contain other noises than the above noises, which appear to be generated due to the differences of carrier waves of channels contained in forward signals. As described above, the forward signals use a transmission bandwidth of, for example, 70 MHz to 2.61 GHz, and CATV channels are divided to an interval of 1 to 8 MHz. Noise components substantially equal to this frequency interval are generated in the entire frequency bandwidth of return signals.

Search on the cause of generating noise components has now revealed that once ferrite cores constituting transformers used in CATV equipments such as couplers and distributors are magnetized, the ingress noise increases.

The ferrite cores used in the CATV equipments are usually made of ferrite materials that are not magnetically saturated by electric power used in the CATV systems. However, when a surge current is caused to flow in the CATV equipments by lightning, etc., the ferrite cores are likely to be magnetically saturated. Accordingly, a surge current is prevented from flowing into transformers by connecting a capacitor to each terminal of a coupler, and further by connecting a choke coil between the capacitor and the ground to achieve DC or low-frequency connection to the ground (JP 2001-285819 A), or by disposing a high-pass filter for removing a lower frequency bandwidth than the lowest frequency of the CATV signal (JP 2002-204439 A).

In the conventional method, the magnetic saturation of ferrite cores is prevented by removing a surge current flowing into coupling transformers and distributing transformers by choke coils, filters, etc. This method, however, needs circuit elements such as inductors, capacitors, etc. for constituting choke coils and high-pass filters, resulting in increase in the size of CATV equipments and the number of assembling steps to increase cost. As a result, the assembling of the bi-directional CATV system becomes costly. In addition to the magnetization by a surge current, the ferrite cores are likely to be magnetized by nearing permanent magnets to the ferrite cores, or by unintentionally applying an external magnetic field to the ferrite cores by magnetized tweezers, etc.

Accordingly, it is desired that ferrite cores per se provide simpler measures without needing the above-described complicated means. However, it has been considered difficult to overcome the ingress noise generated by the magnetization of the ferrite cores.

OBJECTS OF THE INVENTION

Accordingly, an object of the present invention is to provide a ferrite core capable of suppressing noises, which are generated by coupling transformers or distributing transformers due to the differences between carrier waves allocated to CATV channels, even when the ferrite core is magnetically saturated for some reasons.

Another object of the present invention is to provide a small, low-cost CATV equipment comprising such a ferrite core.

A further object of the present invention is to provide a low-cost, bi-directional CATV system comprising such a CATV equipment for reducing the ingress noise.

SUMMARY OF THE INVENTION

As a result of intense research in view of the above objects, the inventors have found that the magnetostriction phenomenon of a ferrite core remarkably affects the generation of ingress noise after the ferrite core is once magnetized. The present invention has been completed based on this finding.

Thus, the ferrite core according to the first embodiment of the present invention is made of a ferrite having a saturation magnetostriction $|\lambda_s|$ of $8\times10^{-6}$ or less in an absolute value and an initial permeability $\mu_i$ of 300 or more, which is usable in coupling transformers and distributing transformers in CATV equipments. If the saturation magnetostriction $|\lambda_s|$ were more than $8\times10^{-6}$, effect would be small to suppress distortion from generating due to the differences between carrier waves allocated to CATV channels. If the initial permeability $\mu_i$ were less than 300, a sufficiently large inter-terminal coupling coefficient would not be able to be obtained between input and output terminals or between an output terminal and a coupling terminal on the forward side, when used for distributing transformers and coupling transformers.

The ferrite core according to the second embodiment of the present invention is made of a ferrite having an initial permeability $\mu_i$ of 300 or more and a maximum impedance distortion ratio of 4 or less after magnetic saturation in a frequency range between 500 kHz and 2000 kHz including a mechanical resonance frequency $f_0$, which is usable in coupling transformers and distributing transformers in CATV equipments.

Though the definition of the maximum impedance distortion ratio after magnetic saturation will be described below, the maximum impedance distortion ratio of more than 4 would exert little effect to suppress the generation of distortion due to the differences between carrier waves allocated to CATV channels.

In the first and second embodiments, when a magnetic field of 10 to 2000 A/m is applied to the above ferrite at room temperature, the residual magnetic flux density Br of the ferrite is preferably 150 mT or less. When the residual magnetic flux density Br exceeds 150 mT, the initial permeability drastically decreases after magnetic saturation, resulting in large loss in the distributing transformers and the coupling transformers.

In the first and second embodiments, a squareness ratio represented by a ratio Br/Bm of a residual magnetic flux density Br to a saturation magnetic flux density Bm is preferably 0.5 or less. When the squareness ratio exceeds 0.5, the above-described maximum impedance distortion ratio becomes large, resulting in little effect of suppressing the generation of distortion due to the differences between carrier waves. When the ferrite core is used in coupling transformers or distributing transformers, the saturation magnetic flux density Bm may be 220 mT or more at room temperature. The saturation magnetic flux density Bm is preferably 300 mT or more to prevent the ferrite core from being magnetically saturated by a surge current easily.

The ferrite used in the present invention is preferably a soft ferrite having a composition comprising 47 to 50% by mol of $Fe_2O_3$, 29 to 34% by mol of ZnO, 9 to 15% by mol of NiO and 7 to 9% by mol of CuO as main components.

When $Fe_2O_3$ is less than 47% by mol, the initial permeability $\mu_i$ of the ferrite is too small. On the other hand, when $Fe_2O_3$ exceeds 50% by mol, the resistivity of the ferrite drastically decreases, failing to exhibit high insulation inherent in Ni—Zn ferrite. When ZnO is less than 29% by mol, the initial permeability $\mu_i$ of the ferrite is too small. On the other hand, when ZnO exceeds 34% by mol, the Curie temperature Tc of the ferrite becomes too low. When NiO is less than 9% by mol, the Curie temperature Tc is too low. On the other hand, when NiO exceeds 15% by mol, the saturation magnetostriction $\lambda_S$ becomes too large. When CuO is less than 7% by mol, the resultant ferrite has a small sintering density and a small initial permeability $\mu_i$. On the other hand, when CuO exceeds 9% by mol, the resultant ferrite has large loss.

This ferrite may contain as an additional component at least one of Si, Co, Bi, Mn, Mg and Ca, each in an amount of less than 2% by mass when converted to $SiO_2$, $Co_3O_4$, $Bi_2O_3$, MnO, MgO and CaO, respectively. Though these additional components do not affect the magnetostriction of the ferrite, they exhibit effects of accelerating the sintering of the ferrite, improving the stress resistance of the ferrite, and controlling high Q, $\alpha\mu r$ and Tc. When the total amount of the additional components is 5% or more by mass, the magnetic properties of the ferrite are undesirably deteriorated.

Preferable in the present invention is to use a ferrite having a composition comprising as main components 50 to 55% by mol of $Fe_2O_3$, and 10 to 14% by mol of ZnO, the balance being MnO.

When $Fe_2O_3$ is less than 50% by mol or more than 55% by mol, the initial permeability $\mu_i$ of the ferrite is too small. When ZnO is less than 10% by mol, the initial permeability $\mu_i$ of the ferrite is too small. On the other hand, when ZnO exceeds 14% by mol, the Curie temperature Tc of the ferrite decreases.

This ferrite may contain as an additional component at least one of Si, Co, Bi, Mg and Ca each in an amount of less than 2% by mass when converted to $SiO_2$, $Co_3O_4$, $Bi_2O_3$, MgO and CaO, respectively. Though these additional components do not affect the magnetostriction of the ferrite, they exhibit effects of accelerating the sintering of the ferrite, improving the stress resistance of the ferrite, and controlling high Q, $\alpha\mu r$ and Tc. When the total amount of the additional components is 5% or more by mass, the magnetic properties of the ferrite are undesirably deteriorated.

The ferrite core of the present invention is preferably a multi-hole core or a toroidal core.

The CATV equipment according to the third embodiment of the present invention comprises a coupling transformer and/or a distributing transformer constituted by the above ferrite core with a winding. Examples of the CATV equipment are a coupler, a distributor and an amplifier.

The bi-directional CATV system according to the embodiment of the present invention comprises the CATV equipments such as transmission line laid between the headend and each terminal of CATV system subscribers an amplifier for bi-directional CATV signals disposed in the transmission line, a distributor and/or a coupler for CATV signals. Examples of the transmission line include coaxial mainlines, optical fiber cables, etc. The bi-directional CATV system comprises CATV equipments, at least part of which are the above CATV equipments of the present invention.

BRIEF DESCRIPTION OF THE DRAWINGS

FIG. 15 is a block diagram showing a noise-measuring circuit.

DETAILED DESCRIPTION OF THE PREFERRED EMBODIMENTS

As a result of intense research on how noise is generated in return signals, the inventors have noticed that the change of magnetic properties of a ferrite core by magnetization affects the generation of noise, and have confirmed the frequency characteristics of impedance before and after magnetization on the ferrite core with windings, the ferrite core generating noise after magnetization. As a result, it has been found that high impedance distortion is caused at a frequency of 2000 kHz or less, on the lower frequency side than the frequency bandwidth used by CATV signals.

Figure 1:
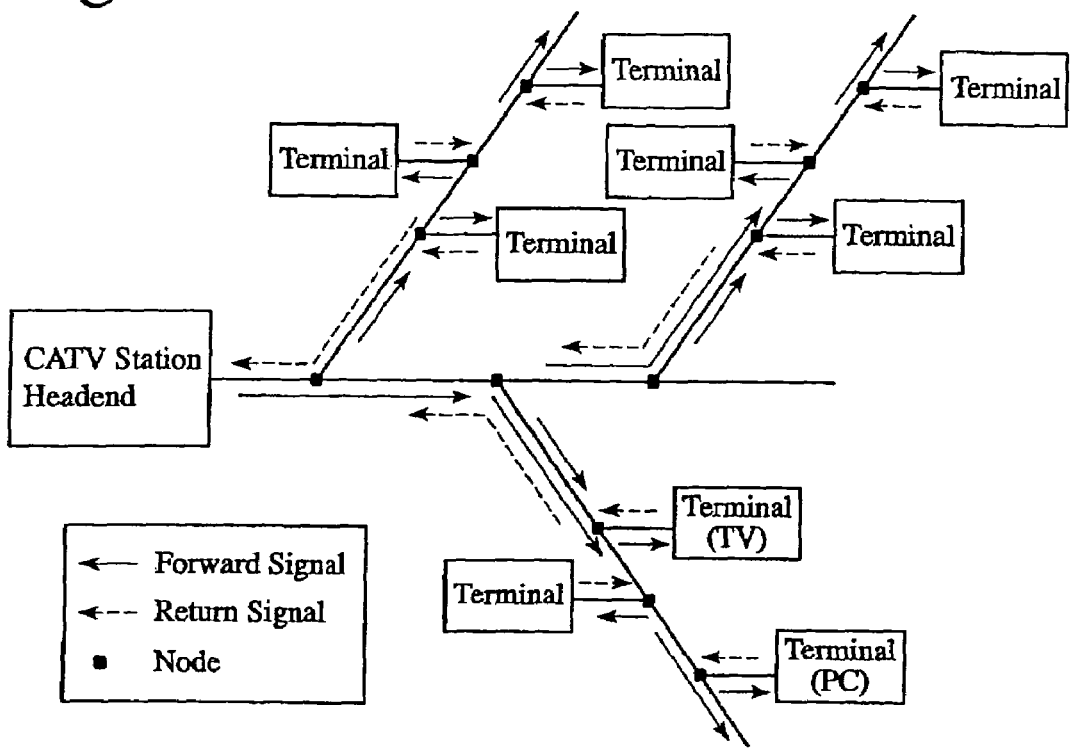
FIG. 1 is a block diagram showing a tree-type network of coaxial cables in the CATV system of the present invention.
Figure 2:
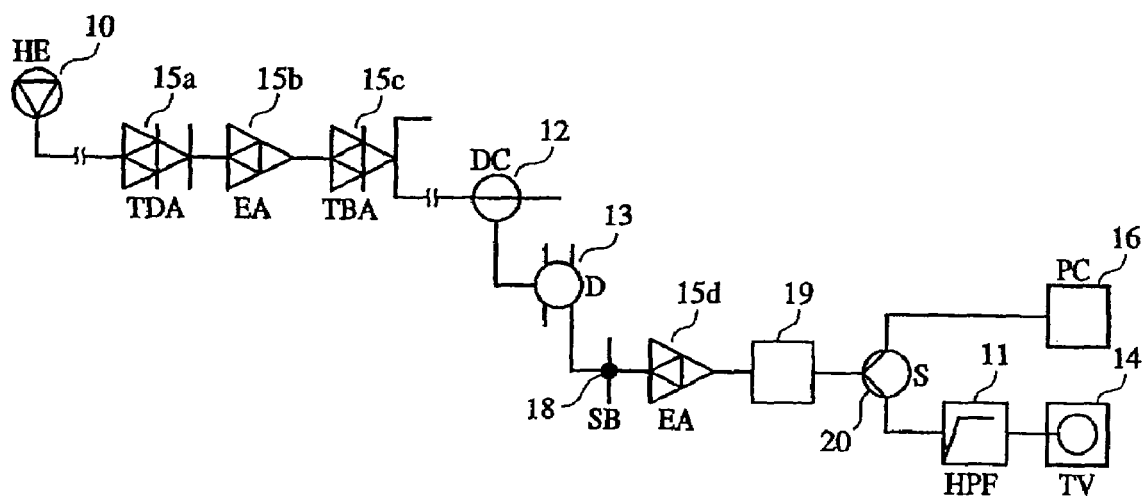
FIG. 2 is a block diagram showing a main part of the CATV system of the present invention.
Figure 3:
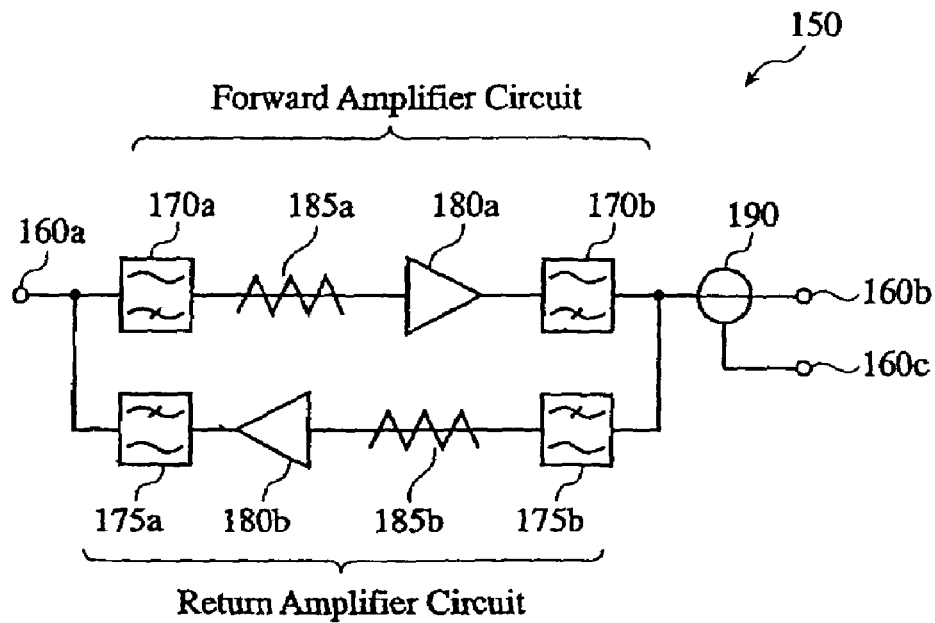
FIG. 3 is a block diagram showing one example of bi-directional amplifiers according to the present invention.
Figure 4:
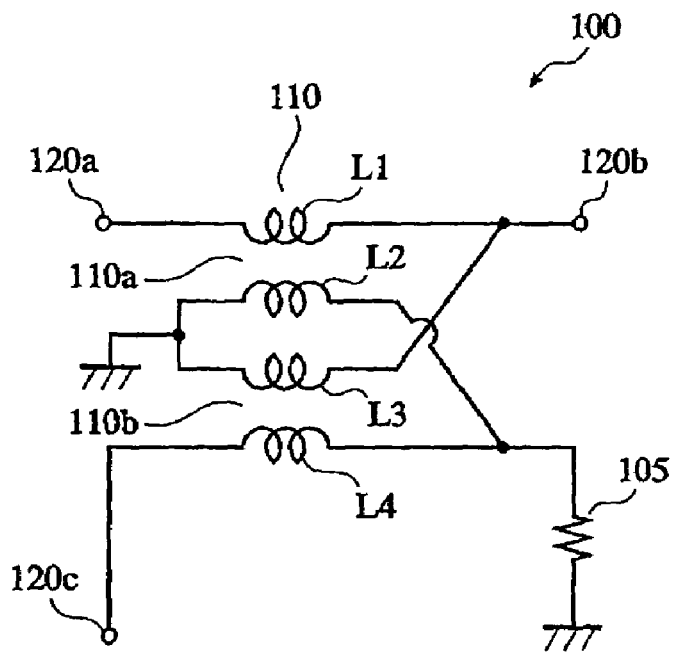
FIG. 4 is a block diagram showing one example of couplers according to the present invention.
Figure 5:
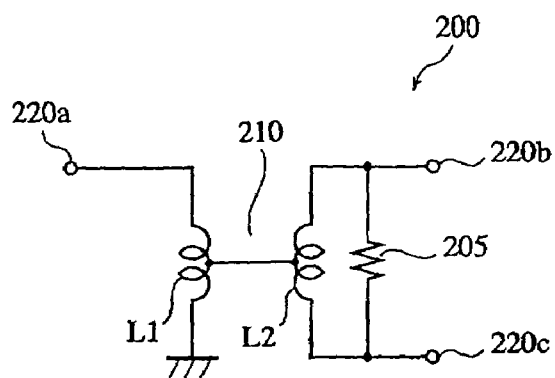
FIG. 5 is a block diagram showing one example of distributors according to the present invention.
Figure 6:
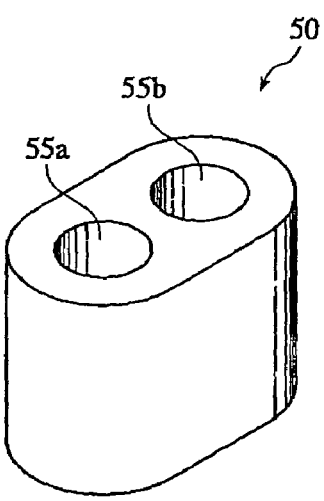
FIG. 6 is a perspective view showing one example of the ferrite cores of the present invention.
Figure 7:
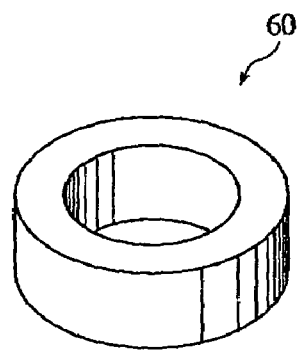
FIG. 7 is a perspective view showing another example of the ferrite cores of the present invention.
Figure 8:
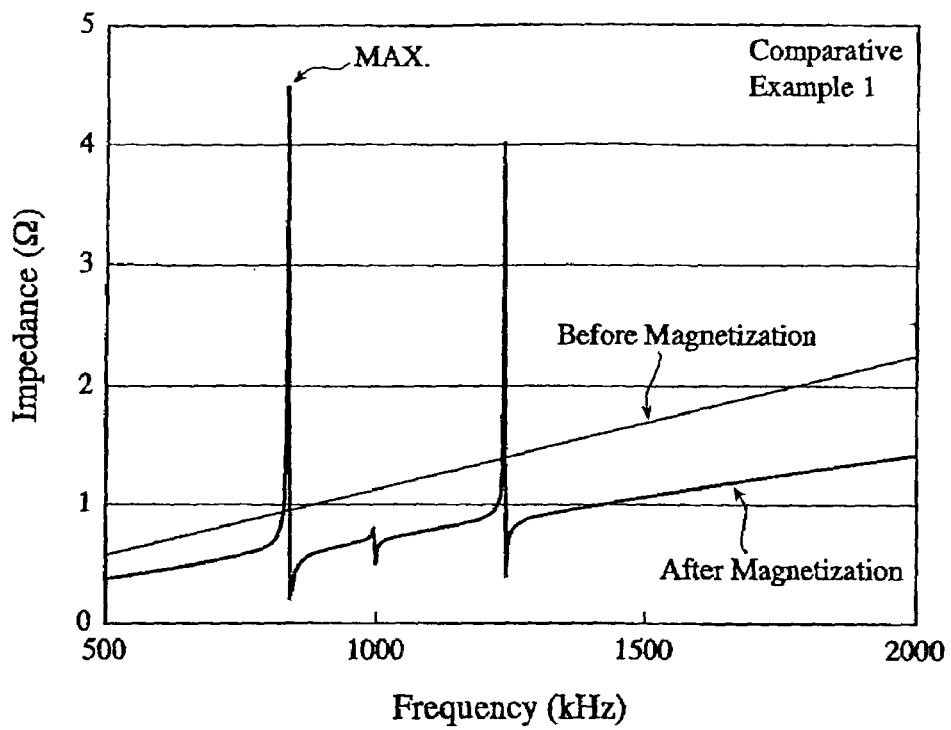
FIG. 8 is a graph showing the frequency characteristics of impedance in a conventional ferrite core (Comparative Example 1)

FIG. 8 shows the frequency characteristics of impedance before and after magnetization in the ferrite core of Comparative Example 1 mentioned below. As shown in FIG. 8, the impedance distortion occurs at three positions between 500 kHz and 2000 kHz, and the impedance is lowered to about ⅔ because of the reduction of the initial permeability after magnetization.

Though the reduction of impedance affects the performance of the transformer, it appears to hardly affect noise. The inventors have come to know that impedance distortion occurring outside the frequency bandwidth of CATV signals causes noises to be generated in return signals. Based on this knowledge, it has been discovered that even when the ferrite core is magnetically saturated, it is possible to reduce the noise by decreasing the impedance distortion.

To control the impedance distortion, it is necessary to identify its cause. As a result of further investigation, the inventors have presumed that the impedance distortion is induced by the magnetostriction phenomenon (causing dimensional changes of a magnetic body by magnetization) of the ferrite.

Magnetostriction will be simply explained here. Though distortion does not occur in the ferrite core in a usual state, distortion occurs when magnetized. This is because though there are arbitrarily spontaneous magnetization directions in a sintered body in an unmagnetized state, the application of a sufficiently large magnetic field causes the spontaneous magnetization directions to align, thereby generating the magnetostriction. This magnetostriction is generally called as saturation magnetostriction.

The saturation magnetostriction $\lambda_S$ ($\Delta L/L$=dimensional change rate) of a typical simple ferrite can be determined from magnetostriction constants $\lambda_{100}$, $\lambda_{111}$ by the formula; $\lambda_S = \frac{2}{5}(\lambda_{100}) + \frac{3}{5}(\lambda_{111})$, and the values of the saturation magnetostriction $\lambda_S$ are shown Table 1. See Hiraga, Okutani and Ojima, "Ferrite," issued by Maruzen Co., Ltd. in 1986.

TABLE 1

| Simple Ferrite | $\lambda_S$ ($10^{-6}$) | $\lambda_{100}$ ($10^{-6}$) | $\lambda_{111}$ ($10^{-6}$) |
|---|---|---|---|
| $ZnFe_2O_4$ | 0 | — | — |
| $MgFe_2O_4$ | −6 | −10 | +2 |
| $MnFe_2O_4$ | −7 | −25 | +4.5 |
| $CoFe_2O_4$ | −110 | −250 | — |
| $NiFe_2O_4$ | −32 | −46 | −22 |
| $CuFe_2O_4$ | −10 | — | — |

The saturation magnetostriction $\lambda_S$ of any ferrite having an arbitrary composition can be calculated from the data of simple ferrites shown in Table 1 above, taking their molar ratios into account. In the case of ferrites lacking in $Fe_2O_3$ ($Fe_2O_3$ is less than 50% by mol), the saturation magnetostriction $\lambda_S$ should be determined taking into account the order of forming each simple ferrite as described below.

The ferrite core having such magnetostriction generates large magnetostriction vibration at a frequency having a close relation to a core shape. This frequency is called "mechanical resonance frequency" herein. It is known that the mechanical resonance frequency $f_0$ (Hz) in a thin, ring-shaped core is expressed by the following formula (1):

$$f_0 = \frac{\sqrt{E/\rho}}{2 \times \pi \times R}, \quad (1)$$

wherein R represents an average core radius (m), E represents a Young's modulus (Pa), and ρ represents a density (kg/m³), (Yoshimitsu Kikuchi, "Magnetostriction Vibration and Supersonic Waves" issued by Corona Publishing Co., Ltd. in 1966).

To clarify the relations between impedance distortion and magnetostriction, frequencies at which impedance distortion occurred were measured with respect to a plurality of ferrite cores with different dimensions, and the mechanical resonance frequencies $f_0$ were calculated, to evaluate their relations.

Figure 9:
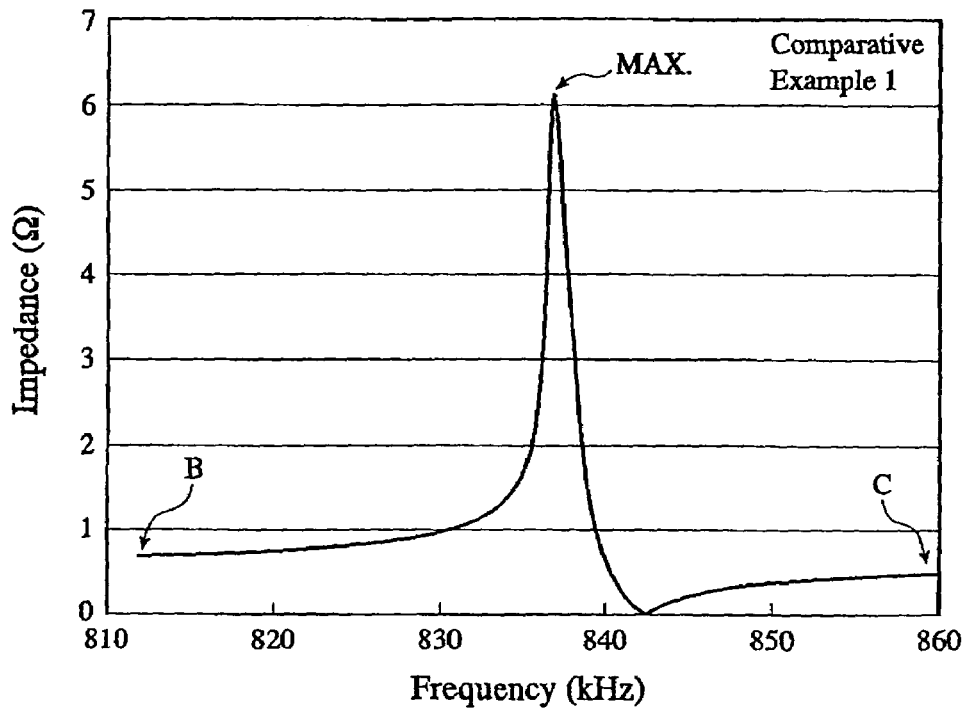
FIG. 9 is a graph showing the frequency characteristics of impedance in a conventional ferrite core (Comparative Example 1)

First, the method of measuring frequencies at which impedance distortion occurs is explained referring to FIGS. 8 and 9. Using a toroidal ferrite core with a one-turn winding of a wire of 0.5 mm in diameter, DC current was applied to cause magnetic saturation, to measure impedance at a frequency of 500 kHz to 2000 kHz. There were plural impedance distortions in the above frequency range, and the impedance distortion having the largest impedance peak value (impedance distortion shown by MAX in FIG. 8) was identified among them. Further, a frequency, at which the impedance has the largest peak value (impedance distortion shown by MAX in FIG. 9) at a measuring span of 50 kHz and a measuring frequency pitch of 125 Hz in the above measuring frequency range (span), is regarded as impedance distortion-generating frequency.

To measure the impedance distortion accurately, it is necessary to accurately measure the peak value and its frequency in as large a span as possible and at as small a pitch as possible. However, because the number of measurement points is limited by a measuring apparatus, proper pitch and span should be determined. For this reason, the measuring frequency pitch is as small as 5 Hz to read an accurate peak value. The frequency pitch necessary for surely reading a value 95% or more of the peak value is calculated to be 175 Hz or less. Accordingly, taking the unevenness of measured samples into account, the measuring frequency pitch and the measuring span are determined to be 125 Hz and 50 kHz, respectively.

In the present invention, to quantitatively determine the impedance distortion, the maximum impedance distortion ratio Dmax is defined by the formula of Dmax=2×Zmax/(Zb+Zc), wherein Zmax represents impedance at the above impedance distortion-generating frequency, Zb represents impedance at a frequency obtained by subtracting 25 kHz from the distortion-generating frequency (point B in FIG. 9), and Zc represents impedance at a frequency obtained by adding 25 kHz to the distortion-generating frequency (point C in FIG. 9).

Table 2 shows the impedance distortion-generating frequencies measured by the above method on toroidal ferrite cores having a composition of 49.0% by mol of $Fe_2O_3$, 32.0% by mol of ZnO, 11.0% by mol of NiO, 8.0% by mol of CuO, and an outer diameter of 3.0 to 4.0 mm, a height of 1.5 to 4.5 mm and an inner diameter of 1.0 mm, together with the calculated mechanical resonance frequency $f_0$.

Incidentally, as parameters necessary for the mechanical resonance frequency $f_0$, the Young's modulus was measured by an ultrasonic pulse method according to JIS R1602, and the density was measured by an Archimedean method. As a result, the Young's modulus was 173 GPa, and the density was $5.22 \times 10^3$ kg/m$^3$.

TABLE 2

| No. | Outer Diameter (mm) | Height (mm) | Inner Diameter (mm) | Mechanical Resonance Frequency $f_0$ (kHz) | Impedance Distortion-Generating Frequency (kHz) |
|---|---|---|---|---|---|
| A1 | 3.0 | 3.0 | 1.0 | 916 | 793 |
| A2 | 3.5 | 3.0 | 1.0 | 814 | 772 |
| A3 | 4.0 | 3.0 | 1.0 | 733 | 706 |
| A4 | 3.5 | 1.5 | 1.0 | 814 | 864 |
| A5 | 3.5 | 3.5 | 1.0 | 814 | 724 |
| A6 | 3.5 | 4.0 | 1.0 | 814 | 628 |
| A7 | 3.5 | 4.5 | 1.0 | 814 | 598 |

As the outer diameter of the ferrite core increases, the impedance distortion-generating frequency decreases, resulting in good accordance with the calculation results of the mechanical resonance frequency $f_0$. Though the mechanical resonance frequency $f_0$ is determined without taking into account the thickness of the toroidal core, it has been found that the thicker the ferrite core, the smaller the impedance distortion-generating frequency. It has been confirmed from these results that the impedance distortion is caused by the magnetostriction vibration phenomenon of the ferrite core.

EXAMPLES 1–12, COMPARATIVE EXAMPLES 1–4

Ferrite cores of Examples 1 to 12 and Comparative Examples 1 to 4 were formed by ferrites having the compositions shown in Table 3, and calculated and measured with respect to saturation magnetostriction $|\lambda_S|$ in an absolute value, a maximum impedance distortion ratio, initial permeability $\mu_i$, a Curie temperature Tc, a saturation magnetic flux density Bm, a residual magnetic flux density Br and a squareness ratio Br/Bm.

TABLE 3

| No. | $Fe_2O_3$ (mol %) | ZnO (mol %) | NiO (mol %) | CuO (mol %) | Saturation Magnetostriction $|\lambda_S|$ ($\times 10^{-6}$) |
|---|---|---|---|---|---|
| Example 1 | 47.20 | 30.00 | 14.80 | 8.00 | 7.09 |
| Example 2 | 48.60 | 31.90 | 11.70 | 7.80 | 7.09 |
| Example 3 | 49.00 | 32.00 | 11.20 | 7.80 | 7.35 |
| Example 4 | 49.60 | 32.00 | 10.70 | 7.70 | 7.78 |
| Example 5 | 48.60 | 32.30 | 11.30 | 7.80 | 6.84 |
| Example 6 | 49.10 | 32.40 | 10.70 | 7.80 | 7.11 |
| Example 7 | 49.50 | 32.50 | 10.20 | 7.70 | 7.36 |
| Example 8 | 48.30 | 32.80 | 11.00 | 7.90 | 6.25 |
| Example 9 | 48.80 | 33.00 | 10.40 | 7.80 | 6.53 |
| Example 10 | 49.30 | 33.00 | 9.90 | 7.80 | 6.94 |
| Example 11 | 48.30 | 33.30 | 10.50 | 7.90 | 5.89 |
| Example 12 | 48.80 | 33.40 | 10.00 | 7.80 | 6.20 |
| Comparative Example 1 | 52.00 | 21.00 | 27.00 | 0.00 | 17.68 |
| Comparative Example 2 | 48.00 | 25.00 | 19.00 | 8.00 | 10.77 |
| Comparative Example 3 | 47.50 | 23.00 | 21.50 | 8.00 | 11.58 |
| Comparative Example 4 | 49.85 | 28.95 | 15.20 | 6.00 | 10.74 |

As described above, the calculation of the saturation magnetostriction $\lambda_S$ should take into account the order of forming each simple ferrite. As a simple ferrite, $CuFe_2O_4$ is formed at 850° C. to 900° C., followed by $CoFe_2O_4$ at 900° C. to 1000° C., $ZnFe_2O_4$ at 900° C. to 1000° C., $NiFe_2O_4$ at 1000° C. to 1100° C., and $MnFe_2O_4$ at 1100° C. to 1350° C. Taking into account this order of formation, in the case of the ferrite core of Example 1 having the composition shown in Table 3, for instance, 8% by mol of $CuFe_2O_4$ is first formed, and then 30% by mol of $ZnFe_2O_4$ and subsequently $NiFe_2O_4$. However, because of the lack of Fe, only 9.2% by mol of $NiFe_2O_4$ is formed, leaving 5.6% by mol of NiO. Namely, the total amount becomes 52.8% by mol, including NiO having no spinel structure. Accordingly, the saturation magnetostriction $\lambda_S$ can be calculated as follows:

$$\lambda_S = [(-10) \times 8 + (0) \times 30 + (-32) \times 9.2] \times 10^{-6} / 52.8 = -7.09 \times 10^{-6}.$$

Next, the production of the ferrite core is explained. $Fe_2O_3$, ZnO, NiO and CuO were weighed, mixed by a medium-stirring mill for 1 hour, and calcined at 900° C. for 1.5 hours. The calcined powder was pulverized in a medium-stirring mill, granulated, formed into a predetermined toroidal core shape, and then sintered at 1000 to 1200° C. for 1 hour to 2 hours to produce a toroidal ferrite core of 3.5 mm in diameter, 3.0 mm in height and 1.0 mm in inner diameter. In addition, multi-hole cores constituting coupling transformers were also produced for the evaluation of noise.

Each of the resultant toroidal ferrite cores was provided with a one-turn winding of a wire of 0.5 mm in diameter to evaluate various characteristics at room temperature. Because the evaluation method of the maximum impedance distortion ratio is the same as above, its explanation will be omitted. Each core was measured with respect to initial permeability $\mu_i$, a Curie temperature Tc, a residual magnetic flux density Br, and a maximum magnetic flux density Bm, using the measuring instruments and conditions shown in Table 4.

Figure 10:
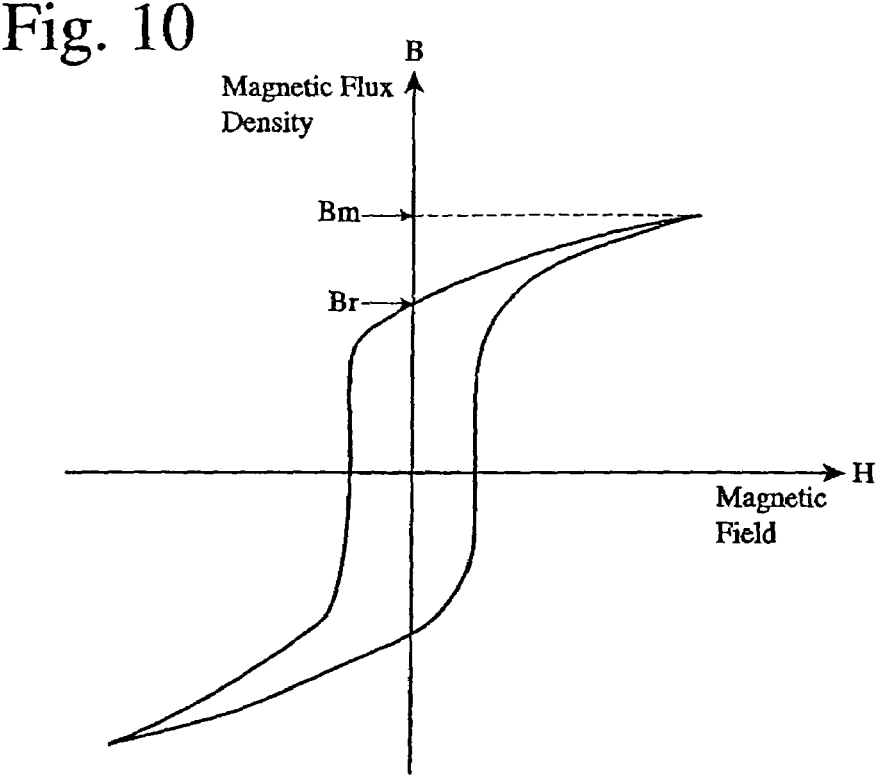
FIG. 10 is a graph showing a hysteresis curve for determining a squareness ratio Br/Bm.

Applying a magnetic field of 10 to 2000 A/m using a BH analyzer, the hysteresis loop shown in FIG. 10 was formed to determine a magnetic flux density Br at a magnetic field H of 0 A/m, and a maximum magnetic flux density Bm. These results were used to calculate a ratio of Br/Bm as a squareness ratio.

The evaluation results of the characteristics of each sample are shown in Table 5.

TABLE 4

| No. | Parameter | Measuring Instrument | Measuring Conditions |
|---|---|---|---|
| 1 | Initial Permeability $\mu_i$ | LCR Meter: HP4192 | 100 kHz, 1 mA |
| 2 | Curie Temp. Tc (° C.) | LCR Meter: HP4192 Thermostatic Chamber | JIS C2561 |
| 3 | Br, Bm, and Br/Bm | BH Analyzer: IWATSU-SY8232 | 1 kHz, 10 to 2000 A/m |

TABLE 5

| No. | Initial Permeability $\mu_i$ | Curie Temperature Tc (° C.) | Saturation Magnetostriction $|\lambda_s|$ ($\times 10^{-6}$) | Maximum Impedance Distortion Ratio |
|---|---|---|---|---|
| Example 1 | 500 | 170 | 7.09 | 3.59 |
| Example 2 | 939 | 134 | 7.09 | 1.09 |
| Example 3 | 1108 | 121 | 7.35 | 1.04 |
| Example 4 | 1401 | 119 | 7.78 | 1.33 |
| Example 5 | 1014 | 119 | 6.84 | 1.11 |
| Example 6 | 1375 | 109 | 7.11 | 1.18 |
| Example 7 | 1606 | 109 | 7.36 | 1.17 |
| Example 8 | 978 | 113 | 6.25 | 1.17 |
| Example 9 | 1213 | 103 | 6.53 | 1.26 |
| Example 10 | 1561 | 100 | 6.94 | 1.20 |
| Example 11 | 1017 | 110 | 5.89 | 1.33 |
| Example 12 | 1095 | 100 | 6.20 | 1.46 |
| Comparative Example 1 | 330 | 200 or more | 17.68 | 9.67 |
| Comparative Example 2 | 480 | 200 or more | 10.77 | 5.46 |
| Comparative Example 3 | 350 | 200 or more | 11.58 | 6.23 |
| Comparative Example 4 | 800 | 190 | 10.74 | 5.72 |

| No. | Maximum Magnetic Flux Density Bm (mT) at 2000 A/m | Residual Magnetic Flux Density Br (mT) Maximum | Residual Magnetic Flux Density Br (mT) at 2000 A/m | Squareness Ratio Br/Bm Maximum | Squareness Ratio Br/Bm at 2000 A/m |
|---|---|---|---|---|---|
| Example 1 | 264 | 103 | 95 | 0.49 | 0.36 |
| Example 2 | 248 | 67 | 47 | 0.40 | 0.19 |
| Example 3 | 249 | 75 | 55 | 0.44 | 0.22 |
| Example 4 | 250 | 85 | 71 | 0.49 | 0.28 |
| Example 5 | 240 | 66 | 43 | 0.40 | 0.18 |
| Example 6 | 241 | 71 | 51 | 0.43 | 0.21 |
| Example 7 | 242 | 85 | 67 | 0.49 | 0.28 |
| Example 8 | 230 | 61 | 39 | 0.40 | 0.17 |
| Example 9 | 231 | 67 | 47 | 0.44 | 0.20 |
| Example 10 | 232 | 80 | 63 | 0.48 | 0.27 |
| Example 11 | 221 | 66 | 43 | 0.41 | 0.19 |
| Example 12 | 222 | 79 | 58 | 0.47 | 0.26 |
| Comparative Example 1 | 431 | 324 | 324 | 0.85 | 0.75 |
| Comparative Example 2 | 340 | 150 | 134 | 0.58 | 0.39 |
| Comparative Example 3 | 340 | 131 | 120 | 0.51 | 0.37 |
| Comparative Example 4 | 328 | 200 | 200 | 0.7 | 0.61 |

Figure 11:
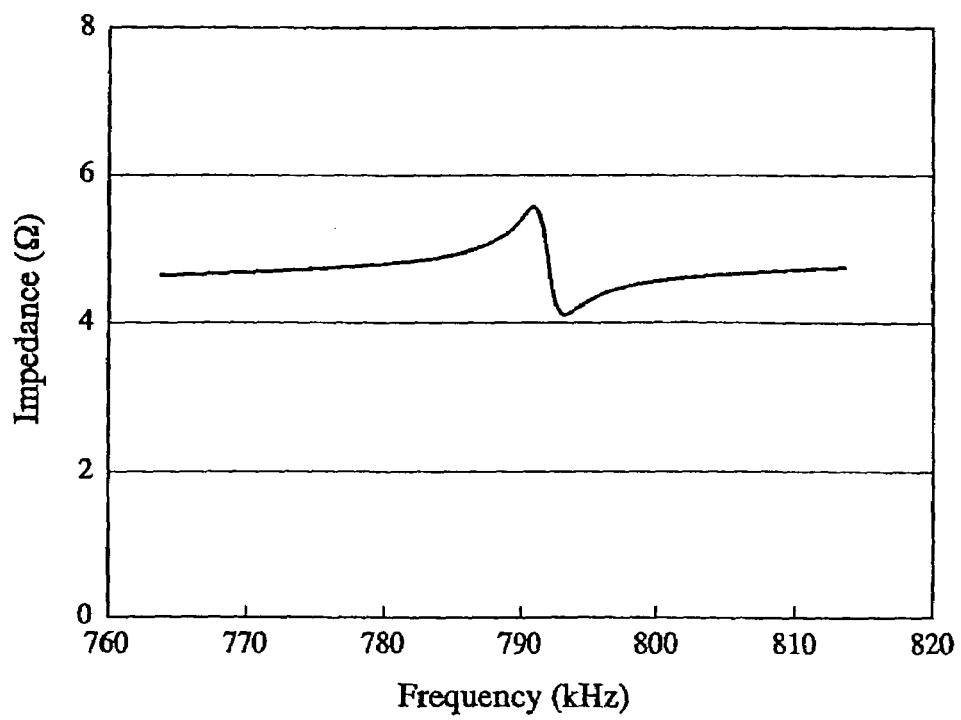
FIG. 11 is a graph showing the frequency characteristics of impedance in the ferrite core of the present invention (Example 6)
Figure 12A:
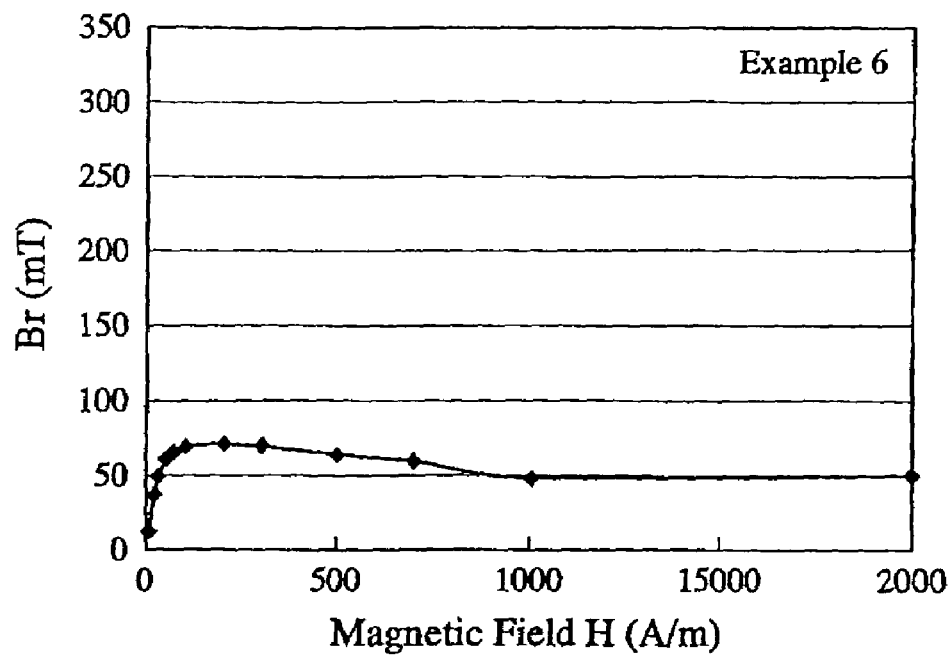
FIG. 12(a) is a graph showing the relations between a magnetic field H and a residual magnetic flux density Br in the ferrite core of the present invention (Example 6)
Figure 12B:
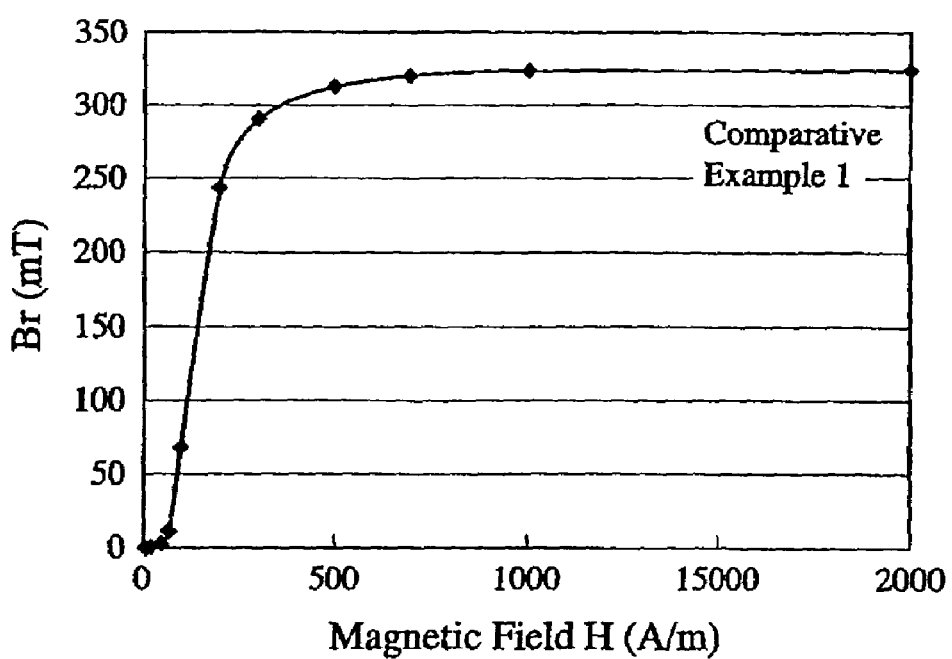
FIG. 12(b) is a graph showing the relations between a magnetic field H and a residual magnetic flux density Br in the conventional ferrite core (Comparative Example 1)
Figure 13A:
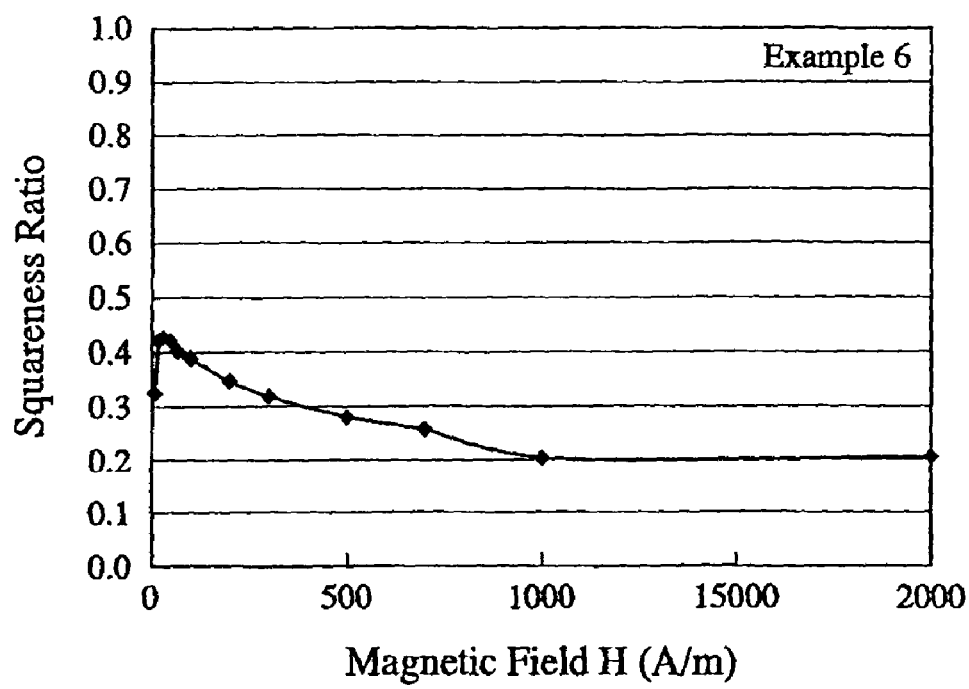
FIG. 13(a) is a graph showing the relations between a magnetic field H and a squareness ratio Br/Bm in the ferrite core of the present invention (Example 6)
Figure 13B:
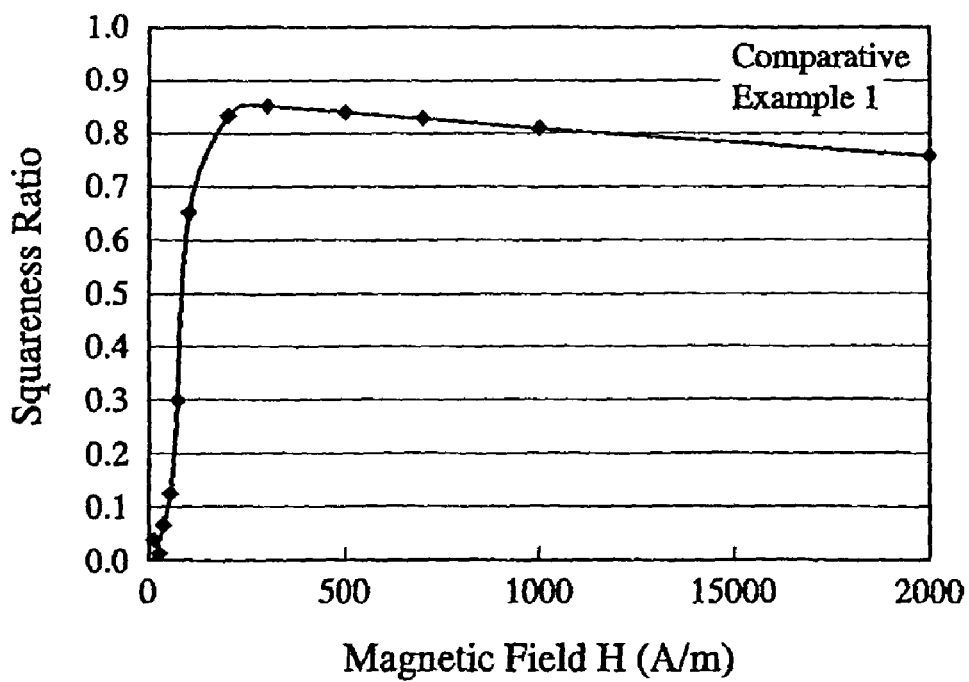
FIG. 13(b) is a graph showing the relations between a magnetic field H and a squareness ratio Br/Bm in the conventional ferrite core (Comparative Example 1)

As an example of the ferrite cores having small saturation magnetostriction $|\lambda_s|$ (Example 6), the frequency characteristics of impedance are shown in FIG. 11. This sample had remarkably reduced impedance distortion than that of Comparative Example 1, which generates noise after magnetization. FIGS. 12(a) and 12(b) show the relations between a magnetic field H and a residual magnetic flux density Br in the ferrite cores of Example 6 and Comparative Example 1, and FIGS. 13(a) and 13(b) show the relations between a magnetic field H and a squareness ratio Br/Bm in the ferrite cores of Example 6 and Comparative Example 1. The residual magnetic flux density and the squareness ratio in Example 6 are remarkably lower than those in Comparative Example 1 in a wide range of magnetic field.

Figure 14:
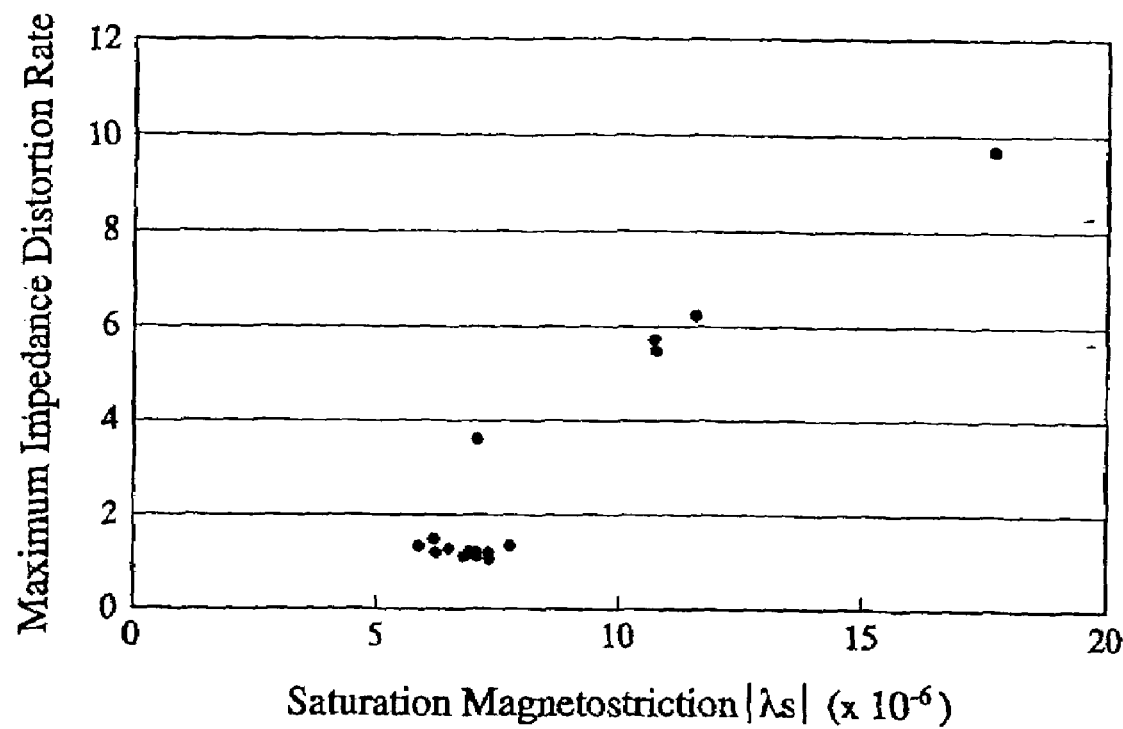
FIG. 14 is a graph showing the relations between a saturation magnetostriction and a maximum impedance distortion ratio.

Evaluated from the above results are the relations between saturation magnetostriction $|\lambda_s|$ and a maximum impedance distortion ratio (FIG. 14). Because the saturation magnetostriction $|\lambda_s|$ and the maximum impedance distortion ratio had a positive correlation, the smaller the saturation magnetostriction $|\lambda_s|$, the more the maximum impedance distortion ratio can be reduced.

The multi-hole ferrite cores (spectacle-shaped cores) of Examples 1 to 12 and Comparative Examples 1 to 4 were provided with windings to provide coupling transformers, and the above ferrite cores were magnetically saturated. Thereafter, with each coupling transformer 190 disposed in the evaluation circuit shown in FIG. 15, high-frequency signals of 93 to 537 MHz were supplied as forward signals at a 6-MHz pitch from a signal generator 60a to the evaluation circuit via a high-pass filter 170b on the input terminal side. With the output terminal 160b of the coupling transformer 190 terminated by a line impedance of 75 Ω, high-frequency signals of 10 to 55 MHz generated by the signal generator 60b were input as return signals to the coupling terminal of the coupling transformer 190, and high-frequency signals obtained via a low-pass filter 175b, namely noise overlapped to the return signals of 10 to 55 MHz in CATV, were evaluated by a spectrum analyzer 65. As a result, a lot of noise was contained in Comparative Examples 1 to 4. The ferrite cores with a larger saturation magnetostriction in an absolute value and a larger maximum impedance distortion ratio provide a larger noise level. On the other hand, the ferrite cores of Examples 1 to 12 generated only extremely low-level noise, some of which was as small as about the noise level of the circuit.

Using a network analyzer (Agilent Technologies E5071A), each coupling transformer was evaluated with respect to insertion loss, an inter-terminal coupling coefficient (isolation between the output terminal and the coupling terminal), and reflection characteristics (VSWR) before and after magnetization, there were substantially no changes in the coupling transformers of Examples 1–12, satisfying the required characteristics. On the other hand, some of the coupling transformers of Comparative Examples 1–4 were deteriorated in the above characteristics, failing to satisfy the required characteristics.

It is clear from the above results that even when the ferrite core is magnetically saturated, the coupling transformer and the distributing transformer constituted by this ferrite core can suppress the generation of noises while satisfying the required characteristics according to the present invention. Because a special means is not needed to prevent the ferrite core from being magnetically saturated, the CATV equipment can be miniaturized. The ingress noise caused by the magnetization of the ferrite core in the CATV system is remarkably reduced.

EXAMPLE 13

Though explanation has been made on the Ni—Zn ferrite, it has been confirmed that the effects of the present invention can be achieved in ferrites of other compositions.

A ferrite core was formed by 52.2% by mol of $Fe_2O_3$, 12% by mol of ZnO and 35.8% by mol of MnO in the same manner as in Example 1 except that the sintering temperature was 1200 to 1400° C. With respect to the resultant sintered body, the saturation magnetostriction |λ$_s$| was calculated from Table 1, and the initial permeability μ$_i$, the Curie temperature Tc, and the squareness ratio were measured. The results are shown in Table 6.

TABLE 6

| No. | Example 13 |
|---|---|
| Initial Permeability μ$_i$ | 2400 |
| Curie temperature Tc (° C.) | 200 |
| Saturation Magnetostriction |λ$_s$| (× 10$^{-6}$) | 5.24 |
| Maximum Impedance Distortion Ratio | 1.08 |
| Maximum Magnetic Flux Density Bm (mT) at 2000 A/m | 490 |
| Residual Magnetic Flux Density Br (mT) | |
| Maximum | 140 |
| at 2000 A/m | 140 |
| Squareness Ratio Br/Bm | |
| Maximum | 0.29 |
| at 2000 A/m | 0.29 |

In this Example, it was possible to reduce noises while satisfying characteristics required as a transformer.

Even when the ferrite core is magnetically saturated for some reasons, a coupling transformer or a distributing transformer comprising the ferrite core can suppress noises from being generated due to the differences between carrier waves allocated to CATV channels. Accordingly, ingress noise can be suppressed in the bi-directional CATV system. With the ferrite core of the present invention, the CATV equipments can be miniaturized and made inexpensive, thereby providing a low-cost, bi-directional CATV system with decreased ingress noise.

Because the CATV equipments of the present invention can be used together with conventional CATV equipments, a new infrastructure need not be constructed.

What is claimed is:

1. A CATV equipment comprising a coupling transformer and/or a distributing transformer, each of which is constituted by a ferrite core and a winding wound around said ferrite core, said ferrite core being made of a ferrite having a saturation magnetostriction |λ$_s$| of 8×10$^{-6}$ or less in an absolute value and an initial permeability μ$_i$ of 300 or more, wherein said ferrite has a residual magnetic flux density Br of 150 mT or less in a magnetic field of 10 to 2000 A/m, and wherein said ferrite has a squareness ratio of 0.5 or less, said squareness ratio being represented by a ratio Br/Bm of a residual magnetic flux density Br to a maximum magnetic flux density Bm.

2. The CATV equipment according to claim 1, said ferrite core being made of a ferrite having an initial permeability μ$_i$ of 300 or more, and a maximum impedance distortion ratio of 4 or less after magnetic saturation in a frequency range between 500 kHz and 2000 kHz including a mechanical resonance frequency f$_0$.

3. The CATV equipment according to claim 1, wherein said ferrite has a composition either comprising as main components 47 to 50% by mol of Fe$_2$O$_3$, 29 to 34% by mol of ZnO, 9 to 15% by mol of NiO, and 7 to 9% by mol of CuO or comprising as main components 50 to 55% by mol of Fe$_2$O$_3$ and 10 to 14% by mol of ZnO, the balance being substantially MnO.

4. The CATV equipment according to claim 1, wherein said ferrite core is a multi-hole core or a toroidal core.

5. A bi-directional CATV system comprising transmission lines comprising coaxial mainlines or optical fiber cables disposed between a headend and the terminals of CATV subscribers, at least part of said CATV equipments comprising a coupling transformer and/or a distributing transformer, each of which is constituted by a ferrite core and a winding wound around said ferrite core, said ferrite core being made of a ferrite having a saturation magnetostriction |λ$_s$| of 8×10$^{-6}$ or less in an absolute value and an initial permeability μ$_i$ of 300 or more, wherein said ferrite has a residual magnetic flux density Br of 150 mT or less in a magnetic field of 10 to 2000 A/m, and wherein said ferrite has a squareness ratio of 0.5 or less, said squareness ratio being represented by a ratio Br/Bm of a residual magnetic flux density Br to a maximum magnetic flux density Bm.

* * * * *

UNITED STATES PATENT AND TRADEMARK OFFICE
CERTIFICATE OF CORRECTION

PATENT NO. : 7,061,355 B2 Page 1 of 1
APPLICATION NO. : 10/649777
DATED : June 13, 2006
INVENTOR(S) : Satoru Tanaka et al.

It is certified that error appears in the above-identified patent and that said Letters Patent is hereby corrected as shown below:

On the title page item [75] Please correct the fourth inventor's name to read as follows:

--Yoshihito YOSHI_ZAWA, Saitama-ken, (JP)--.

Signed and Sealed this

Twenty-first Day of November, 2006

JON W. DUDAS
*Director of the United States Patent and Trademark Office*